UNITED STATES PATENT OFFICE.

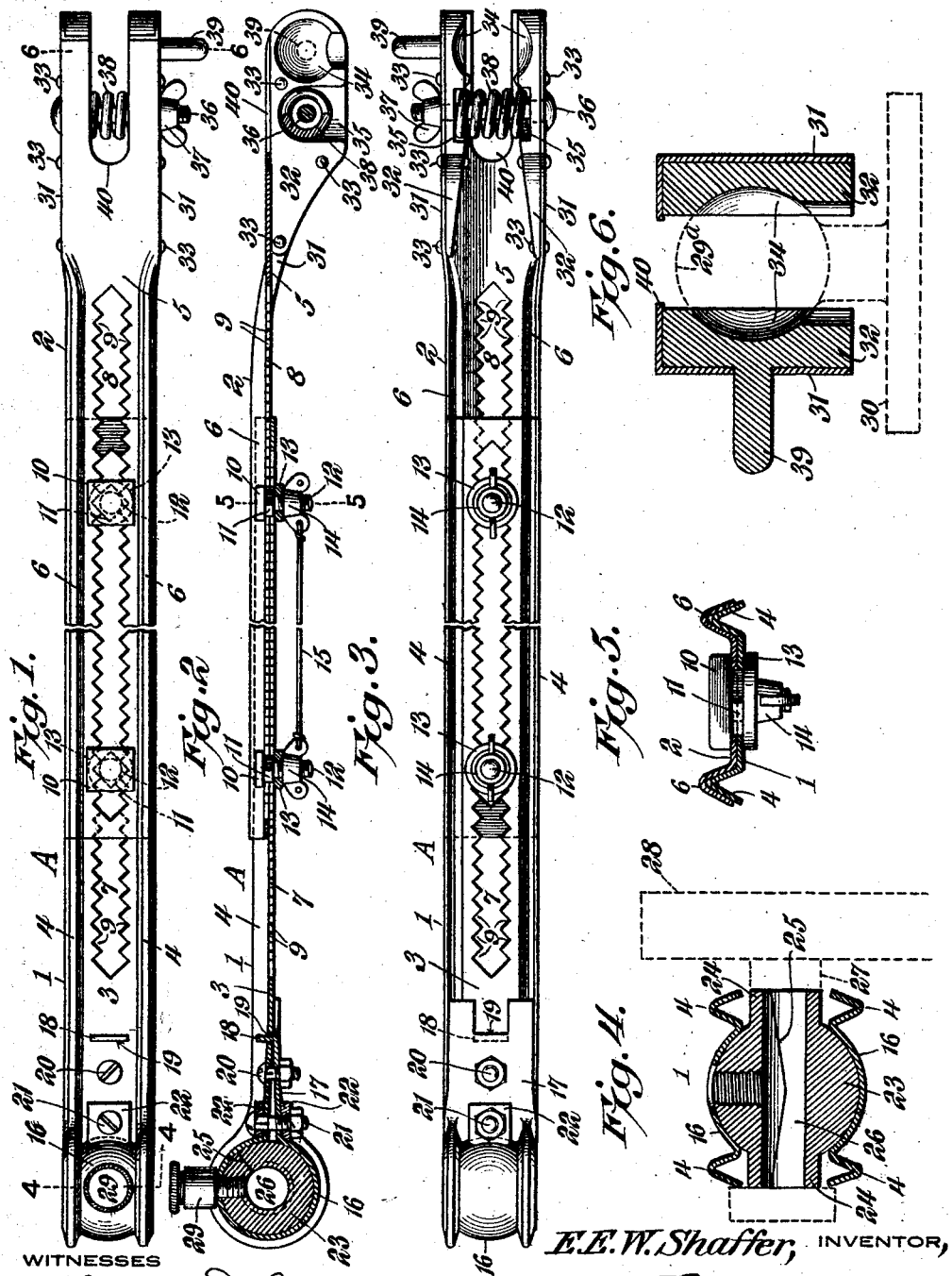

EDMUND EMANUEL WILKIS SHAFFER, OF WICHITA, KANSAS.

PITMAN.

1,318,611.   Specification of Letters Patent.   Patented Oct. 14, 1919.

Application filed December 2, 1918.  Serial No. 264,955.

*To all whom it may concern:*

Be it known that I, EDMUND E. W. SHAFFER, a citizen of the United States, residing at Wichita, in the county of Sedgwick and State of Kansas, have invented a new and useful Pitman, of which the following is a specification.

This invention has reference to a pitman for mowers and binders, or for any other machines to which the pitman may be adapted.

The object of the invention is to provide a pitman of light construction possessing great strength and capable of variation in length to adapt it to different purposes.

The invention comprises a body portion formed of two parts slidable one on the other and provided with marginal nesting ribs serving as strengthening means and guides. Means are provided for fastening the two parts of the body member in any position of longitudinal adjustment. At one end the pitman is provided with a ball and socket bearing for the wrist pin of an actuating disk and at the other end has a box connection for the ball usually present on the sickle bar, the construction permitting great flexibility of connection without loss of strength or rigidity where needed. Such construction is particularly adapted for use in a mower. In the case of a binder, the ball and socket construction is employed at both ends.

The invention will be best understood from a consideration of the following detailed description taken in connection with the accompanying drawing forming part of this specification, with the understanding, however, that the invention is not confined to any strict conformity with the showing of the drawing but may be changed and modified so long as such changes and modifications mark no material departure from the salient features of the invention as expressed in the appended claims.

In the drawing:—

Figure 1 is a plan view of the pitman as adapted for a mower.

Fig. 2 is a longitudinal central section of the pitman shown in Fig. 1, some parts being illustrated in elevation.

Fig. 3 is a bottom plan view of the structure shown in Fig. 1.

Fig. 4 is a section on the line 4—4 of Fig. 1, but drawn on a larger scale.

Fig. 5 is a section on the line 5—5 of Fig. 2, but drawn on a larger scale and with the clamp bolt in elevation.

Fig. 6 is a section on the line 6—6 of Fig. 1, but drawn on a larger scale.

Referring to the drawing, there is shown a pitman A composed of two similar members 1, 2 respectively, the members 1 and 2 being relatively narrow with respect to their length and so arranged that they overlap longitudinally. The pitman member 1 forming a part of the body portion of the pitman is formed with a central web 3 and marginal ribs 4. The pitman body member 2 is formed with a central web 5 and marginal ribs 6. The ribs 4 and 6 are of generally V-shape in cross section and so proportioned that the ribs 4 nest in the ribs 6, thus permitting the members 1 and 2 to slide on each other longitudinally of the pitman. These ribs or beads also materially strengthen and stiffen the pitman and permit the formation of the pitman of sheet metal of comparatively thin gage without sacrifice of strength, the construction thereby materially lightening the pitman.

The body members 1 and 2 of the pitman have the web portions 3 and 5 formed with longitudinal slots 7 and 8 respectively, with their long edges notched as shown at 9, the slots being so formed as to match in different positions of longitudinal adjustment of the body members 1 and 2.

In order to secure the two body members 1 and 2 together in the adjusted positions and hold them against change of adjustment, there are provided bolts 10 each with a head at one end, said head having a squared shank 11 and a threaded stem 12. The head 10 is too large to pass through a slot 7 or 8 and the squared shank 11 is of a size to lodge in matching notches 9, while the stem 12 is of a size to extend through the member 2 and receive a washer 13 and a wing nut 14. The wings of the nut 14 may be perforated for the reception of a tie wire 15 to prevent the nuts when set up from loosening.

The member 1 of the pitman is returned upon itself at the outer end to form a partially globular shell 16 and the ribs 4 may be continued about this shell to contribute to its strength and rigidity. The return portion of the shell has an extension 17 along the web 3 and terminates in a tongue 18 bent at an angle to the extension 17 and projecting through a slot 19 in the web 3 to hold the extension 17 from movement longitudinally of the member 1. A bolt 20 passed through the web 3 and extension 17 serves to hold these parts together and prevent the escape of the tongue 18 from traversing relation to the web 3. Closely adjacent to the shell 16 the extension 17 and web 3 are traversed by another bolt 21 serving as a clamp bolt and provided with washers 22 between the head and nut of the bolt and the respective web 3 and extension 17.

Housed in the shell 17 is a partially globular block 23 having alined hubs 24 on diametrically opposite sides extending about to the outer edges of the ribs 4. The block 23 is split longitudinally, as shown at 25, the split being angular. The block has a bore 26 extending through the hubs 24 and the angular split 25 permits a contraction and expansion of the bore so that it may be readily applied to a wrist pin 27 on a disk 28 and adjusted to such a degree of fit as may be found to be advisable. A grease cup 29 applied to the shell 16 and extending through the block 23 for lubricating the wrist pin.

The shell or box 16 at the end of the pitman member 1 does not quite reach to the hubs 24 so that a certain amount of play or movement is permitted between the block or ball 23 and the shell or box setting it. This provides for any twisting of the machine by which the pitman is carried so that the shell or box 16 and block or ball 23 constitutes in effect a ball and socket joint with limited movement but sufficient to accommodate any twisting which may occur. Of course, the bore 26 may be made to accommodate wrist pins 27 of different sizes as may be necessary. In a mower, the ball and socket arrangement made up of the shells 16 and block 23 is provided at one end of the pitman while a different arrangement is provided at the other end, but in a binder the two ends of the pitman may be alike, that is, each end is provided with a ball and socket connection.

In a mower, the pitman is connected at one end to a wrist pin, like the wrist pin 27 but at the other end must connect to a ball 29$^a$ shown in dotted lines in Fig. 6, and usually present on the sickle bar indicated in dotted lines at 30 in Fig. 6.

The corresponding end of the member 2 of the pitman has side flange extensions 31 of the web 5 and fast to the inner face of each flange 31 is an elongated plate 32 secured by rivets 33 or otherwise to the flanges 31. Each plate 32 has a cup 34 formed on the face toward the other plate so that the ball 29$^a$ may be lodged between the two plates 32 in the cups or cavities 34 therein. Close to the cup 32 each plate 31 has a recess 35 on the face toward the other plate and extending between the two plates and traversing both is a bolt 36 having a wing nut 37 at one end and surrounded between the two plates 32 by a spring 38, the ends of which spring enter the recesses 35. One of the plates 32 is provided with a horn extension 39 designed to receive and support the sickle bar 30 when raised.

The outer end of the web 2 is provided with a longitudinal entering slot 40 permitting a limited approach of the extreme ends of the member 2 formed by the slot 40. By means of the nut 37 the socket portions 34 of the plates 32 may be made to grasp the ball 29$^a$ with the requisite force, while the spring 38 causes the grasping action to be more or less yieldable whereby the pitman may hold and actuate the sickle bar firmly yet freely.

What is claimed is:—

1. A pitman comprising a body portion consisting of two sheet metal members adjustable upon each other lengthwise of the pitman, and with means at the opposite ends of the pitman for connecting it to machinery, the two members having their long sides provided with nesting beads or ribs formed of the same sheet metal as the body of the pitman.

2. A pitman comprising a body portion formed of two elongated sheet metal members having attaching ends and provided with nesting beads or ribs at the sides and with longitudinal slots each having a series of matching notches in their long edges, and fastening devices traversing the slots and engaging in the notches, whereby to lock the two members in different positions of longitudinal adjustment.

3. A pitman comprising two elongated sheet metal members, each having means at one end for fastening it to machinery and comprising a central web with a longitudinal slot and marginal beads with the beads of one member nesting in the beads of the other, and means traversing the slots to lock the members together in different positions of longitudinal adjustment.

4. A pitman comprising two elongated sheet metal members slidable one on the other in the direction of the length of the pitman, both members being formed at the long edges into longitudinal ribs or beads with the beads of one member nesting in those of the other, said beads serving as guiding and strengthening means for the pitman members, and connections traversing and joining the pitman members between the beads, whereby the pitman members are held in different positions of longitudinal adjustment.

5. A pitman having a member comprising a strip of sheet metal returned upon itself at one end to form a box and provided with an extension with fastening means traversing the body of the strip and the return portion, said return portion being shaped into a partially globular shell, and a partially globular block with diametrically opposite hubs and a bore traversing the block and hub, the shell stopping short of the hubs to permit rocking movements of the block in the shell.

6. A pitman having a member comprising a strip of sheet metal having a central web and side flanges joining the web at one end of the strip, with the web provided with a longitudinal entering slot at said end, a plate fast to each flange with the plates in facing relation and the faces toward each other formed with matching cups or sockets and with recesses adjacent to the cups, a bolt traversing the plates where recessed, and a spring carried by the bolt and engaging at the ends in recesses.

7. A pitman comprising two elongated sheet metal members in overlapping relation and each provided with a longitudinal slot matching the slot in the other member and the slots having matching notches in the long sides, said pitman members having ribs or beads on the edges with the beads of one member nesting in those of the other and constituting strengthening means and longitudinal guides, fastening devices traversing the slots and engaging in the notches for holding the pitman members in different positions of longitudinal adjustment, one pitman member returned upon itself to form a shell and the other pitman member being provided on opposite edges with facing flanges, a partially globular block seated in the shell and provided with diametrically opposite hubs, with the shell stopping short of the hubs and said block having a diametric bore extending through the hubs, opposed plates fast to the inner faces of the flanges on the end of the other pitman member and each having a socket and a recess therein, a bolt extending through the plates at the recesses and through the side flanges of said pitman member, and a spring on the bolt with its ends seated in the recesses, the second-named pitman member having the flanged end provided with a longitudinal slot.

8. A pitman comprising two elongated sheet metal members in overlapping relation and each provided with a longitudinal slot matching the slot in the other member and the slots having matching notches in the long sides, said pitman members having ribs or beads on the edges with the beads of one member nesting in those of the other and constituting strengthening means and longitudinal guides, fastening devices traversing the slots and engaging in the notches for holding the pitman members in different positions of longitudinal adjustment, one pitman member returned upon itself to form a shell and the other pitman member being provided on opposite edges with facing flanges, a partially globular block seated in the shell and provided with diametrically opposite hubs, with the shell stopping short of the hubs and said block having a diametric bore extending through the hubs, opposed plates fast to the inner faces of the flanges on the end of the other pitman member and each having a socket and a recess therein, a bolt extending through the plates at the recesses and through the side flanges of said pitman member, and a spring on the bolt with its ends seated in the recesses, the second-named pitman member having the flanged end provided with a longitudinal slot, said pitman members having nesting side beads and matching longitudinal slots with fastening means traversing the slots to hold the members in different positions of longitudinal adjustment.

In testimony, that I claim the foregoing as my own, I have hereto affixed my signature.

EDMUND EMANUEL WILKIS SHAFFER.

Witnesses:
 ALBERT SNAKELBURG,
 G. G. ALMOND.

Copies of this patent may be obtained for five cents each, by addressing the "Commissioner of Patents, Washington, D. C."